United States Patent
White et al.

(10) Patent No.: US 7,734,579 B2
(45) Date of Patent: Jun. 8, 2010

(54) PROCESSING PROGRAM CONTENT MATERIAL

(75) Inventors: Scott White, Austin, TX (US); James Cansler, Jr., Pflugerville, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 452 days.

(21) Appl. No.: 11/351,150

(22) Filed: Feb. 8, 2006

(65) Prior Publication Data

US 2007/0186247 A1 Aug. 9, 2007

(51) Int. Cl.
G06F 7/00 (2006.01)
G06F 17/00 (2006.01)

(52) U.S. Cl. .............. 707/609; 707/618; 707/620; 707/625; 707/696

(58) Field of Classification Search .............. None
See application file for complete search history.

(56) References Cited

U.S. PATENT DOCUMENTS

| | | | |
|---|---|---|---|
| 5,612,742 A * | 3/1997 | Krause et al. | 375/240.25 |
| 6,289,165 B1 | 9/2001 | Abecassis | |
| 6,400,996 B1 | 6/2002 | Hoffberg et al. | |
| 6,609,096 B1 | 8/2003 | De Bonet et al. | |
| 6,774,926 B1 | 8/2004 | Ellis et al. | |
| 6,934,964 B1 | 8/2005 | Schaffer | |
| 6,986,154 B1 | 1/2006 | Price et al. | |
| 7,039,298 B1 | 5/2006 | Watkins | |
| 7,046,911 B2 | 5/2006 | Zimmerman et al. | |
| 7,139,983 B2 | 11/2006 | Kelts | |
| 2002/0069218 A1 | 6/2002 | Sull et al. | |
| 2002/0108127 A1 | 8/2002 | Lew et al. | |
| 2002/0118950 A1 * | 8/2002 | Molinet, III | 386/68 |
| 2002/0166123 A1 | 11/2002 | Schrader et al. | |

(Continued)

FOREIGN PATENT DOCUMENTS

WO WO-0005884 A1 2/2000

(Continued)

OTHER PUBLICATIONS

"CDfreaks.com", http://www.cdfreaks.com/article/211/8, In search report under General: 2,(Observed Jan. 26, 2005),23 pgs.

(Continued)

Primary Examiner—Tim T. Vo
Assistant Examiner—Jay A Morrison
(74) Attorney, Agent, or Firm—Guntin Meles & Gust, PLC; Ed Guntin/Andrew Gust (57) ABSTRACT

A method and system to process program content material are described herein. A received data stream includes program content data associated with a particular program and includes index data corresponding to the program content data of the particular program. The index data includes one of a plurality of program format codes. A database determines a program format type of the particular program. The database includes the plurality of program format codes and includes a corresponding plurality of program format types, wherein each program format type is associated with a specific division of program content material. Chapter points of the particular program are determined based on the associated specific division of program content material of the program format type corresponding to the one of the plurality of program format codes of the index data.

10 Claims, 5 Drawing Sheets

U.S. PATENT DOCUMENTS

| | | |
|---|---|---|
| 2002/0184195 A1 | 12/2002 | Qian |
| 2003/0061206 A1 | 3/2003 | Qian |
| 2003/0085997 A1* | 5/2003 | Takagi et al. ............... 348/143 |
| 2003/0093790 A1 | 5/2003 | Logan et al. |
| 2003/0093792 A1 | 5/2003 | Labeeb et al. |
| 2003/0182567 A1 | 9/2003 | Barton et al. |
| 2003/0202533 A1 | 10/2003 | Taylor |
| 2003/0202772 A1 | 10/2003 | Dow et al. |
| 2003/0202773 A1 | 10/2003 | Dow et al. |
| 2003/0208626 A1 | 11/2003 | Gibbon et al. |
| 2003/0220100 A1 | 11/2003 | McElhatten et al. |
| 2004/0034869 A1 | 2/2004 | Wallace et al. |
| 2004/0177370 A1 | 9/2004 | Dudkiewicz |
| 2004/0220926 A1* | 11/2004 | Lamkin et al. ................. 707/3 |
| 2004/0221311 A1 | 11/2004 | Dow et al. |
| 2005/0044561 A1* | 2/2005 | McDonald ................... 725/18 |
| 2005/0132398 A1 | 6/2005 | Baran et al. |
| 2005/0144635 A1 | 6/2005 | Boortz |
| 2005/0193425 A1 | 9/2005 | Sull et al. |
| 2005/0210145 A1 | 9/2005 | Kim et al. |
| 2006/0048191 A1* | 3/2006 | Xiong ......................... 725/52 |
| 2006/0218183 A1* | 9/2006 | Ivey et al. ............... 707/104.1 |
| 2006/0225097 A1* | 10/2006 | Lawrence-Apfelbaum ... 725/61 |
| 2007/0174276 A1 | 7/2007 | Sullivan et al. |
| 2008/0112690 A1 | 5/2008 | Shahraray et al. |
| 2008/0124055 A1 | 5/2008 | Shahraray et al. |

FOREIGN PATENT DOCUMENTS

| | | |
|---|---|---|
| WO | WO-2007087325 A2 | 8/2007 |
| WO | WO-2007087325 A3 | 4/2008 |
| WO | WO-2008057876 A1 | 5/2008 |

OTHER PUBLICATIONS

"Comskip—Sage TV Community Development—Trac", http://www.sage-community.org/index.cgi/wiki/ComSkip, Blackframe method. Blackframes bookending each commercial detected by DVR with less than a pre-defined variable-e.g. standard commercial lengths.,(Observed Jan. 24, 2006),2 pgs.

"ComSkip Homepage", http://gbpvr.com/pmwiki/pmwiki.php/Manual/ComSkip, Blackframe method. Blackframes bookending each commercial detected by DVR with less than a pre-defined variable-e.g. standard commercial lengths. 2nd of 2 URLs in search report,(Observed Jan. 24, 2006),5 pgs.

"Cyberhome (CH) DVR 1500 Operation Guide", ftp://209.237.61.78/cyberhome/1500/manual/1500E.PDF, In search report under "2. Chapter points subdivided into segments of predetermined lengths (Fixed Interval). (optional chapter points at beginning, end, and 5 minutes from end).",(Observed Jan. 25, 2006),41 pgs.

"Cyberhome DVR 1500", http://www.cyberhome.com/products.asp?Product=1500, In search report under "2. Chapter points subdivided into segments of predetermined lengths (Fixed Interval). (optional chapter points at beginning, end, and 5 minutes from end).",(Observed Jan. 25, 2006),4 pgs.

"Pioneer DVR 520-S and 320-S General Information", http://www.pioneerelectronics.com/pna/learn/about/chapters/0,,2076_124669747_124669751,00.html, In search report under General:1,(Observed Jan. 26, 2006),3 pgs.

"Pioneer DVR-630H-S Operating Instructions", http://www.pioneer-eur.com/eur/content/support/support/manuals.html, In search report under 2. Chapter points subdivided into segments of predetermined lengths (Fixed Interval). (optional chapter points at beginning, end, and 5 minutes from end),(Observed Jan. 24, 2006),127 pgs.

"About Tivo", http://www.tivo.com/0.0.asp, (Retrieved Jan. 24, 2006),2 pgs.

"CD Freaks", http://www.cdfreaks.com/article/211/8, (Retrieved Jan. 24, 2005),23 pgs.

"GB-PVR", http://www.gbpvr.com, (Observed Jan. 24, 2006),3 pgs.

"Pioneer.sound.vision.soul", http://www.pioneerelectronics.com/pna/learn/about/chapters/0,,2076_124669747_124669751,00.html, (Retrieved Jan. 24, 2006),3 pgs.

"Tivo suggestions", http://customersupport.tivo.com/TiVoCollection/9350C8EC-393F-4D9B-8A45-D50B6D0FB2E3/ins_Content.html, Accessed Oct. 20, 2006,1 pg.

"Tivo Wishlist", http://www.tivo.com/1.2.2.asp, Retrieved Jul. 12, 2006,1 pg.

"U.S. Appl. No. 11/339,223, Non-Final Office Action mailed Dec. 26, 2007", 15 pgs.

"U.S. Appl. No. 11/339,223, Response filed Mar. 26, 2008 to Non-Final Office Action mailed Dec. 26, 2007", 12 pgs.

"International Application Serial No. PCT/US07/01816, International Search Report mailed Feb. 14, 2008", 4 pgs.

"International Application Serial No. PCT/US07/01816, International Search Report mailed Feb. 14, 2008", 8 pgs.

"International Application Serial No. PCT/US2007/083132, International Search Report mailed Apr. 15, 2008", 6 pgs.

"International Application Serial No. PCT/US2007/083132, Written Opinion mailed Apr. 15, 2008", 8 pgs.

Dimitrova, N., et al., "Applications of Video-Content Analysis and Retrieval", *IEEE Multimedia*, IEEE Service Center, New York, NY, US, vol. 9, No. 3, Jul. 2002, 42-55.

Qian, H., et al., "Multimedia Search and Retrieval: New Concepts, System Implementation and Application", *IEEE Transactions on Circuits and Systems for Video Technology*, IEEE Service Center, Piscataway, NJ, US, vol. 10, No. 5, Aug. 2000, 679-692.

"U.S. Appl. No. 11/339,223 response filed Oct. 27, 2008 to Final Office Action mailed Jun. 25, 2008", 11 pgs.

"U.S. Appl. No. 11/339,223, Final Office Action mailed Jun. 25, 2008", 16 pgs.

"U.S. Appl. No. 11/592,830, Response Filed Oct. 27, 2008 to Restriction Requirement mailed Sep. 26, 2008", 8 pgs.

"U.S. Appl. No. 11/592,830, Restriction Requirement mailed Sep. 26, 2008", 5 pgs.

"International Application Serial No. PCT/US2007/001816, Preliminary Report on Patentability mailed Aug. 7, 2008", 8 pgs.

\* cited by examiner

PROCESSING PROGRAM CONTENT MATERIAL

FIELD

The application relates generally to the field of multimedia processing, and more specifically to processing program content material included within content material.

BACKGROUND

Television broadcasting is a linear medium that is temporally delivered. With advances in technology, such as video cassette recorders and digital video recorders (DVR), television viewers have been able to change the temporal nature of television broadcasting.

DVRs may record or store television programming content onto a hard drive, for instance. Also, DVRs have the ability to skip to previous or next chapters within the programming content through a remote control button.

However, index data to indicate placement of program segments (e.g., chapters) and placement of advertisements throughout a program is often not transmitted with the broadcast. Further, content providers may try to obscure the transitions between advertisements and program segments, or between advertisements themselves, such that automatic chapter recognition by the DVR may be difficult.

BRIEF DESCRIPTION OF DRAWINGS

An example embodiment of the present invention is illustrated by way of example and not limitation in the figures of the accompanying drawings, in which like references indicate similar elements.

DETAILED DESCRIPTION

According to an aspect of the present subject matter there is provided a method and system to process program content material. The method includes receiving a data stream, the data stream including program content data associated with a particular program and including index data corresponding to the program content data of the particular program, wherein the index data includes one of a plurality of program format codes; accessing a database to determine a program format type of the particular program, the database including the plurality of program format codes and including a corresponding plurality of program format types, wherein each program format type is associated with a specific division of program content material; and determining chapter points of the particular program based on the associated specific division of program content material of the program format type corresponding to the one of the plurality of program format codes of the index data.

The system includes a device associated with a digital video recorder; a data stream associated with a particular program and provided to the device, the data stream including program content data associated with the particular program and including index data corresponding to the program content data of the particular program, wherein the index data includes one of a plurality of program format codes; and a database accessible by the device and including a look up table of the plurality of program format codes with a corresponding plurality of program format types, each program format type associated with a specific division of program content material, wherein the one of the plurality of program format codes is associated with the program format type of the plurality of program format types of the index data.

Other features of embodiments will be apparent from the accompanying drawings and from the detailed description which follows.

In the following description, for the purposes of explanation, numerous specific details are set forth in order to provide a thorough understanding of the disclosed embodiments. It will be apparent, however, to one skilled in the art that the disclosed embodiments may be practiced without some of these specific details. In other instances, well-known structures and devices are shown in block diagram form.

While embodiments are described with reference to set top boxes, the method and apparatus described herein are equally applicable to other types of program recording or program viewing environments, such as digital video recorders. The systems described herein may alternatively include set-top boxes, for instance, which include or are coupled with digital video recorders.

Example Internet Protocol Television System Environment

Figure 1:
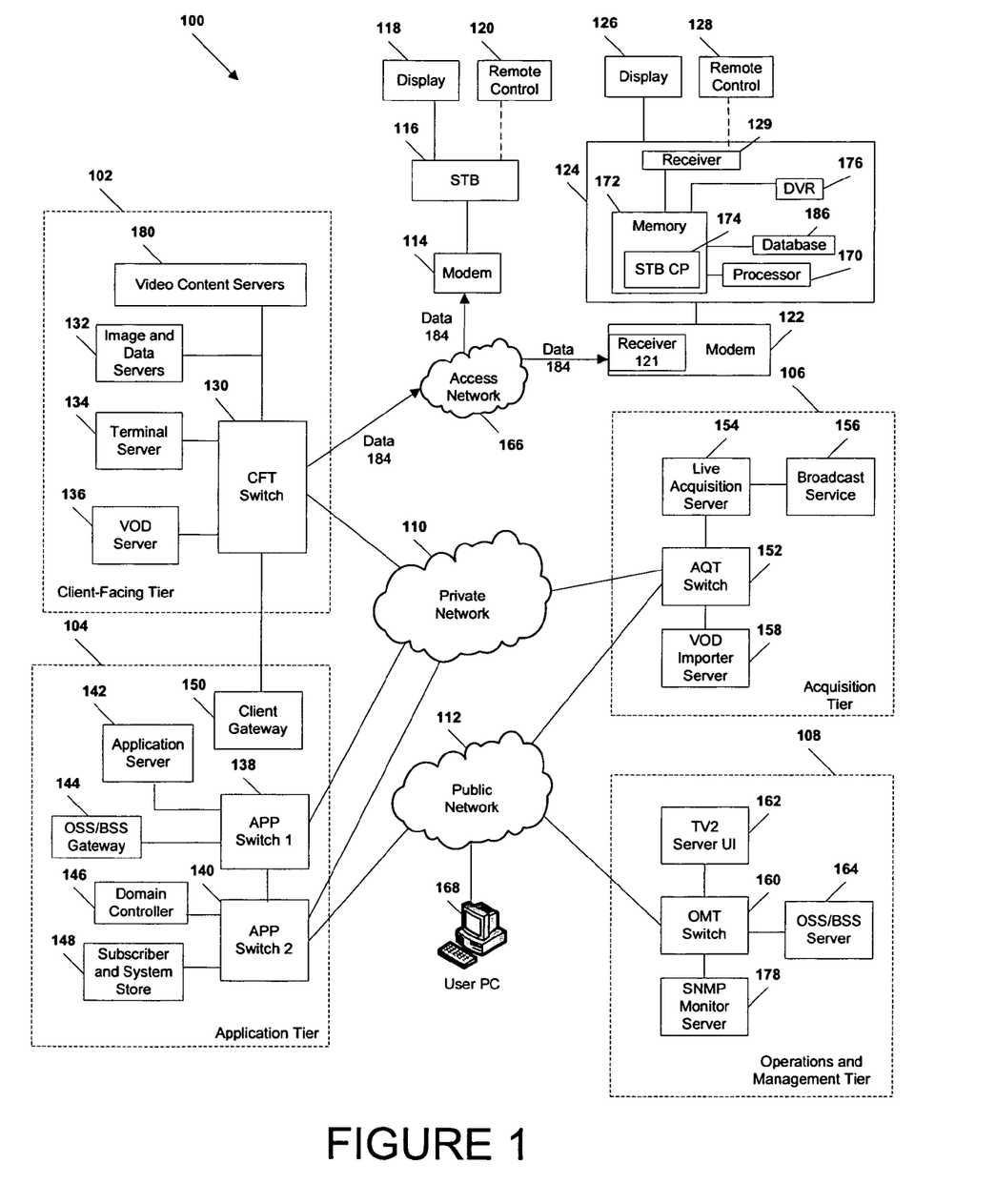
FIG. 1 illustrates an Internet Protocol Television (IPTV) system environment in which an embodiment may be implemented.

Referring to FIG. 1, an illustrative embodiment of an Internet Protocol Television (IPTV) system that may be used to provide video content is illustrated and is generally designated 100. As shown, the system 100 may include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 may be coupled to the private network 110. Further, the application tier 104 may be coupled to the private network 110 and to the public network 112. The acquisition tier 106 may also be coupled to the private network 110 and to the public network 112. Additionally, the operations and management tier 108 may be coupled to the public network 112.

As illustrated in FIG. 1, the various tiers 102, 104, 106, 108 communicate with each other via the private network 110 and the public network 112. For instance, the client-facing tier 102 may communicate with the application tier 104 and the acquisition tier 106 via the private network 110. The application tier 104 may also communicate with the acquisition tier 106 via the private network 110. Further, the application tier 104 may communicate with the acquisition tier 106 and the operations and management tier 108 via the public network 112. Moreover, the acquisition tier 106 may communicate with the operations and management tier 108 via the public network 112. In a particular embodiment, elements of the application tier 104, including, but not limited to, a client gateway 150, may communicate directly with the client-facing tier 102.

As illustrated in FIG. 1, the client-facing tier 102 may communicate with user equipment via a private access network 166, such as an Internet Protocol Television (IPTV) access network. In an illustrative embodiment, modems, such as a first modem 114 and a second modem 122 may be coupled to the private access network 166. The client-facing tier 102 may communicate with a first representative set-top box device 116 via the first modem 114 and with a second representative set-top box device 124 via the second modem 122. Each modem 114, 122 may include a receiver, such as receiver 121 of modem 122, to receive the data 184. The client-facing tier 102 may communicate with a large number of set-top boxes, such as the representative set-top boxes 116, 124, over a wide geographic area, such as a regional area, a metropolitan area, a viewing area, a designated market area or any other suitable geographic area, market area, or subscriber or customer group that may be supported by networking the client-facing tier 102 to numerous set-top box devices. In an illustrative embodiment, the client-facing tier, or any portion thereof, may be included at a video head-end office.

In a particular embodiment, the client-facing tier 102 may be coupled to the modems 114, 122 via fiber optic cables. Alternatively, the modems 114 and 122 may be digital subscriber line (DSL) modems that are coupled to one or more network nodes via twisted pairs, and the client-facing tier 102 may be coupled to the network nodes via fiber-optic cables. Each set-top box device 116, 124 may process data received via the private access network 166, via an IPTV software platform, such as Microsoft® TV IPTV Edition.

Additionally, the first set-top box device 116 may be coupled to a first external display device 118, such as a first television monitor, and the second set-top box device 124 may be coupled to a second external display device 126, such as a second television monitor. Moreover, the first set-top box device 116 may communicate with a first remote control 120, and the second set-top box device may communicate with a second remote control 128, through a receiver 129.

In an example, non-limiting embodiment, each set-top box device 116, 124 may receive data 184, which may include video content and/or audio content or portions, from the client-facing tier 102 via the private access network 166. The data 184 may be associated with at least one program, such as a broadcast program. The data 184 may include program content data associated with the at least one program and index data corresponding to the program content data. The index data may include a program format code associated with the particular program.

Further, the set-top box devices 116, 124 may each include a STB processor, such as STB processor 170, and a STB memory device, such as STB memory 172, which is accessible to the STB processor 170.

In one embodiment, a computer program, such as the STB computer program (STB CP) 174, may be embedded within the STB memory device 172. The memory device 172 may be coupled with a database 186. The database 186 may include a look up table of a plurality of program format codes and a corresponding plurality of program format types. Each program format type is associated with a specific division of program content material, as shown and described in more detail with regard to FIGS. 3 and 4. The specific divisions of program content material may include chapter points that process, e.g., segment, the program content material of the particular program. The program content material may be segmented into program segments and commercial groups, for instance. Chapter points may be placed before and after the program segments and commercial groups, for instance.

Upon receipt of the data 184 (in particular, the index data portion) by the device 116 or 124, the database 186 with the look up table may be accessed to determine which program format type corresponds to the program format code of the particular transmitted program.

The set-top boxes 116, 124 may transmit the data 184 (in particular, the content data portion) to an external display device, such as the display devices 118, 126.

Each set-top box device 116, 124 may also include a video content storage module, such as a digital video recorder (DVR) 176. In a particular embodiment, the set-top box devices 116, 124 may communicate commands received from the remote control devices 120, 128 to the client-facing tier 102 via the private access network 166.

In an illustrative embodiment, the client-facing tier 102 may include a client-facing tier (CFT) switch 130 that manages communication between the client-facing tier 102 and the private access network 166 and between the client-facing tier 102 and the private network 110. As shown, the CFT switch 130 is coupled to one or more image and data servers 132 that store still images associated with programs of various IPTV channels. The image and data servers 132 may also store data related to various channels, e.g., types of data related to the channels and to programs or video content displayed via the channels. In an illustrative embodiment, the image and data servers 132 may be a cluster of servers, each of which may store still images, channel and program-related data, or any combination thereof. The CFT switch 130 may also be coupled to a terminal server 134 that provides terminal devices with a connection point to the private network 110. In a particular embodiment, the CFT switch 130 may also be coupled to a video-on-demand (VOD) server 136 that stores or provides VOD content imported by the IPTV system 100.

The client-facing tier 102 may also include one or more video content servers 180 that transmit video content requested by viewers via their set-top boxes 116, 124. In an illustrative, non-limiting embodiment, the video content servers 180 may include one or more multicast servers.

In an embodiment, the content servers 180 may include a content provider, and in an additional embodiment, the content provider may provide content data through the content servers 180.

Additionally or alternatively to the content servers 180, the index data may be generated, associated, and/or provided by an outside database, the content provider, the device 116, 124, and/or a user of the device 116, 124, in other embodiments not shown.

As illustrated in FIG. 1, the application tier 104 may communicate with both the private network 110 and the public network 112. The application tier 104 may include a first application tier (APP) switch 138 and a second APP switch 140. In a particular embodiment, the first APP switch 138 may be coupled to the second APP switch 140. The first APP switch 138 may be coupled to an application server 142 and to an OSS/BSS gateway 144. In a particular embodiment, the application server 142 may provide applications to the set-top box devices 116, 124 via the private access network 166, which enable the set-top box devices 116, 124 to provide functions, such as display, messaging, processing of IPTV data and VOD material, etc. In a particular embodiment, the OSS/BSS gateway 144 includes operation systems and support (OSS) data, as well as billing systems and support (BSS)

data. In one embodiment, the OSS/BSS gateway 144 may provide or restrict access to an OSS/BSS server 164 that stores operations and billing systems data.

Further, the second APP switch 140 may be coupled to a domain controller 146 that provides web access, for example, to users via the public network 112. For example, the domain controller 146 may provide remote web access to IPTV account information via the public network 112, which users may access using their personal computers 168. The second APP switch 140 may be coupled to a subscriber and system store 148 that includes account information, such as account information that is associated with users who access the system 100 via the private network 110 or the public network 112. In a particular embodiment, the application tier 104 may also include a client gateway 150 that communicates data directly with the client-facing tier 102. In this embodiment, the client gateway 150 may be coupled directly to the CFT switch 130. The client gateway 150 may provide user access to the private network 110 and the tiers coupled thereto.

In a particular embodiment, the set-top box devices 116, 124 may access the IPTV system 100 via the private access network 166, using information received from the client gateway 150. In this embodiment, the private access network 166 may provide security for the private network 110. User devices may access the client gateway 150 via the private access network 166, and the client gateway 150 may allow such devices to access the private network 110 once the devices are authenticated or verified. Similarly, the client gateway 150 may prevent unauthorized devices, such as hacker computers or stolen set-top box devices from accessing the private network 110, by denying access to these devices beyond the private access network 166.

For example, when the first representative set-top box device 116 accesses the system 100 via the private access network 166, the client gateway 150 may verify subscriber information by communicating with the subscriber and system store 148 via the private network 110, the first APP switch 138, and the second APP switch 140. Further, the client gateway 150 may verify billing information and status by communicating with the OSS/BSS gateway 144 via the private network 110 and the first APP switch 138. In one embodiment, the OSS/BSS gateway 144 may transmit a query across the first APP switch 138, to the second APP switch 140, and the second APP switch 140 may communicate the query across the public network 112 to the OSS/BSS server 164. After the client gateway 150 confirms subscriber and/or billing information, the client gateway 150 may allow the set-top box device 116 access to IPTV content and VOD content. If the client gateway 150 cannot verify subscriber information for the set-top box device 116, e.g., because it is connected to an unauthorized twisted pair, the client gateway 150 may block transmissions to and from the set-top box device 116 beyond the private access network 166.

As indicated in FIG. 1, the acquisition tier 106 includes an acquisition tier (AQT) switch 152 that communicates with the private network 110. The AQT switch 152 may also communicate with the operations and management tier 108 via the public network 112. In a particular embodiment, the AQT switch 152 may be coupled to a live acquisition server 154 that receives television or movie content, for example, from a broadcast service 156. In a particular embodiment during operation of the IPTV system, the live acquisition server 154 may acquire television or movie content. The live acquisition server 154 may transmit the television or movie content to the AQT switch 152, and the AQT switch 152 may transmit the television or movie content to the CFT switch 130 via the private network 110.

Further, the television or movie content may be transmitted to the video content servers 180, where it may be encoded, formatted, stored, or otherwise manipulated and prepared for communication to the set-top box devices 116, 124. The CFT switch 130 may communicate the television or movie content to the modems 114, 122 via the private access network 166. The set-top box devices 116, 124 may receive the television or movie content via the modems 114, 122, and may transmit the television or movie content to the display devices 118, 126. In an illustrative embodiment, video or audio portions of the television or movie content may be streamed to the set-top box devices 116, 124.

Further, the AQT switch may be coupled to a video-on-demand importer server 158 that stores television or movie content received at the acquisition tier 106 and communicates the stored content to the VOD server 136 at the client-facing tier 102 via the private network 110. Additionally, at the acquisition tier 106, the video-on-demand (VOD) importer server 158 may receive content from one or more VOD sources outside the IPTV system 100, such as movie studios and programmers of non-live content. The VOD importer server 158 may transmit the VOD content to the AQT switch 152, and the AQT switch 152, in turn, may communicate the material to the CFT switch 130 via the private network 110. The VOD content may be stored at one or more servers, such as the VOD server 136.

When user issue requests for VOD content via the set-top box devices 116, 124, the requests may be transmitted over the private access network 166 to the VOD server 136, via the CFT switch 130. Upon receiving such requests, the VOD server 136 may retrieve the requested VOD content and transmit the content to the set-top box devices 116, 124 across the private access network 166, via the CFT switch 130. The set-top box devices 116, 124 may transmit the VOD content to the display devices 118, 126. In an illustrative embodiment, video or audio portions of VOD content may be streamed to the set-top box devices 116, 124.

FIG. 1 further illustrates that the operations and management tier 108 may include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 may be coupled to an OSS/BSS server 164 and to a simple network management protocol (SNMP) monitor server 178 that monitors network devices within or coupled to the IPTV system 100. In a particular embodiment, the OMT switch 160 may communicate with the AQT switch 152 via the public network 112.

In an illustrative embodiment, the live acquisition server 154 may transmit the television or movie content to the AQT switch 152, and the AQT switch 152, in turn, may transmit the television or movie content to the OMT switch 160 via the public network 112. In this embodiment, the OMT switch 160 may transmit the television or movie content to the TV2 server 162 for display to users accessing the user interface at the TV2 server 162. For example, a user may access the TV2 server 162 using a personal computer (PC) 168 coupled to the public network 112.

Flow Chart

The blocks of the method described below may be performed under the control of a programmed processor, such as processor 302 (FIG. 5), or the logic may be implemented and distributed among hardware, firmware, software, or a combination thereof within the set top box 116, 124, for example.

Figure 2:
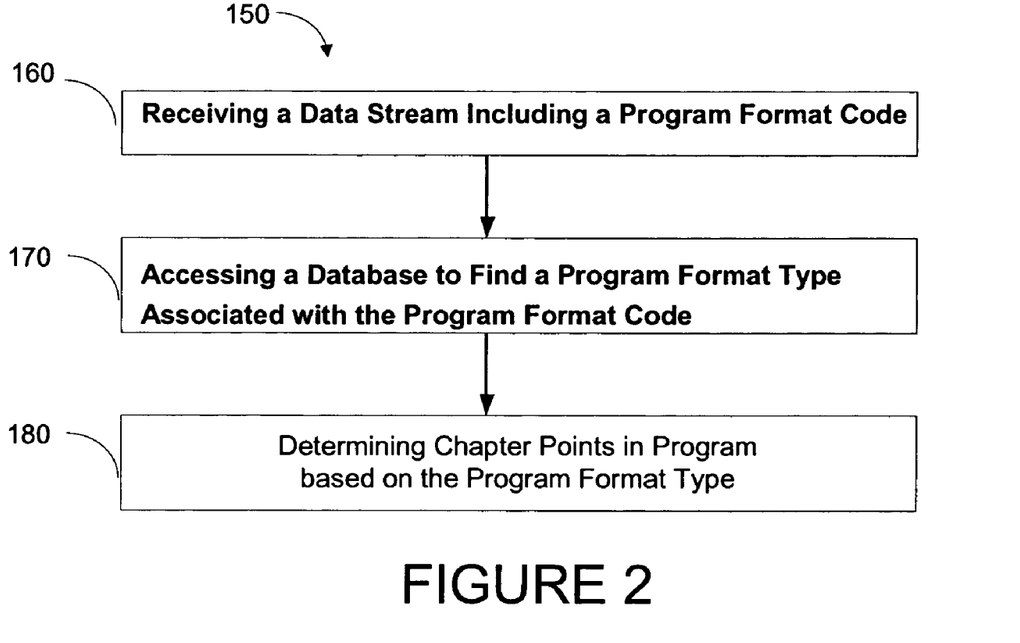
FIG. 2 illustrates a method of segmenting program content material according to an embodiment.

FIG. 2 illustrates a method 150 to segment program content material of a program according to an embodiment.

At 160, the data 184 including the program format code may be received from the content servers 180 through the respective modem 114, 122, for example through the receiver 121 of the modem 122.

At 170, the database 186 may be accessed to determine the program format type associated with the transmitted program format code.

At 180, the chapter points of the particular program may be determined based on the program format type that was determined from accessing the database. The program format type itself may indicate the specific division of program content material, for example, where the chapter points may be placed in the program content material.

Example Embodiments

Programs described below may be selected from a group including a drama, a movie, a situation comedy, a news program, a feature presentation, a special event, a sports program, a variety show, or any other type of program. Programs that are both situation comedies, for example, are considered to be from the same group. The group may be a television programming group.

Figure 3A:
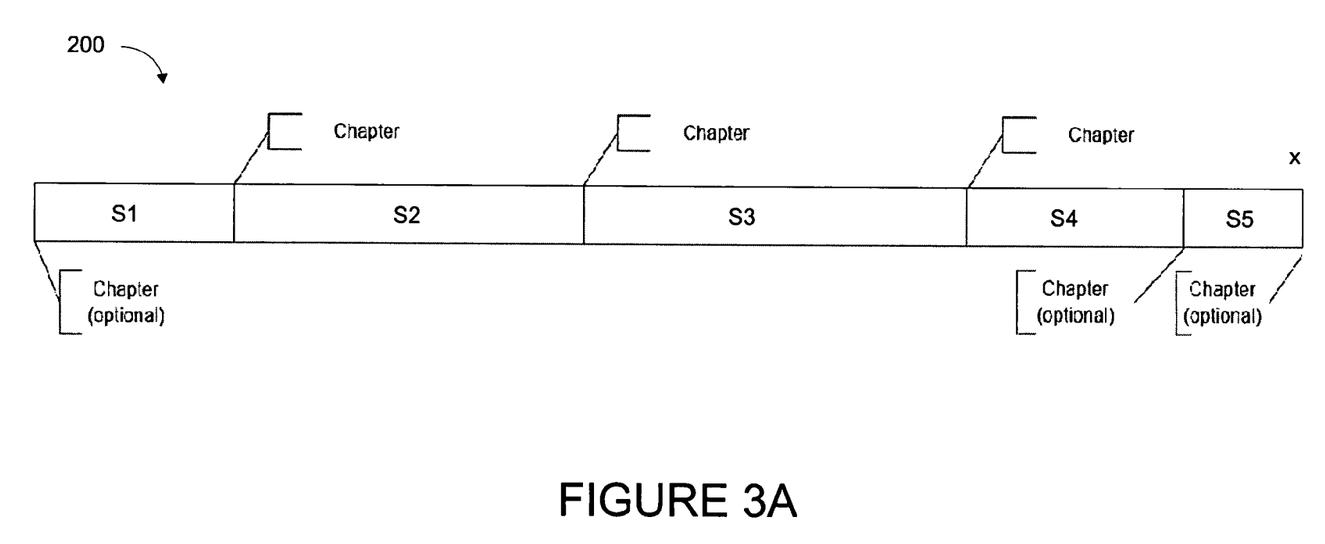
FIG. 3A illustrates a program of a first program content type associated with a first group according to an example embodiment.

FIG. 3A illustrates a program 200 of a first program content type associated with a first group according to an example embodiment. The first program content type may be considered as program content type A. The program format type depends upon the associated group, a time length of the program, and the specific division of program content material, for example, where the chapter points may be placed in the program content material. In this instance, the group may include a situation comedy and the time length of the program may be x, e.g., 30 minutes. The specific division of program content material may be as shown in FIG. 3A.

In one example, there are more than two segments for the particular program. In this particular example, there are five (5) segments, S1, S2, S3, S4, and S5, where S3 is longer than S2, which is longer than S1 and S4, which is longer than S5. In between each segment is a chapter point that enables a user to quickly move to the beginning of each segment. The program content material may be divided into program segments and commercial groups, for instance. In one instance, commercial breaks, such as groups of commercials or advertisements, may be at an end of the segments. Chapter points may be at the beginning or end of the commercial groups and/or at the beginning or end of a program segment, for instance. Chapter points may additionally be inserted at a beginning of the program and at an end of the program.

Figure 3B:
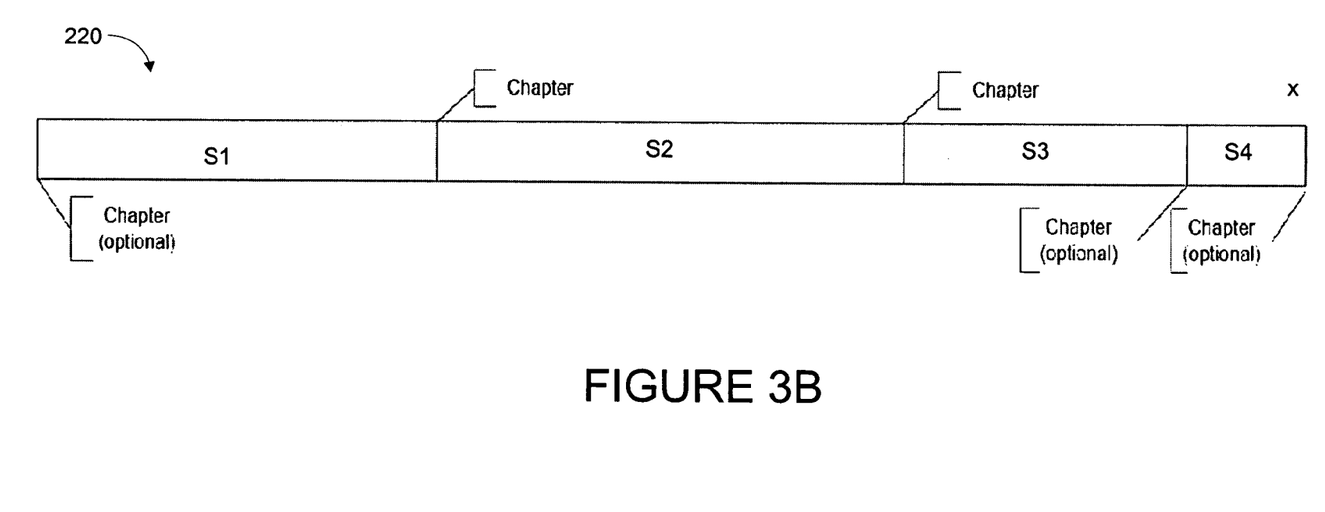
FIG. 3B illustrates a program of a second program content type associated with the first group according to an example embodiment.

FIG. 3B illustrates a program 220 of a second program content type associated with the first group according to an example embodiment. The second program content type may be considered as program content type B. The program 220 in this example is from the same group as the program 200 of FIG. 3A and is of the same time length. However, the specific division of program content material may be as shown in FIG. 3B.

In this particular example, there are four (4) segments, S1, S2, S3, and S4, where S2 is longer than S1, which is longer than S3, which is longer than S4. In between each segment is a chapter point that enables a user to quickly move to the beginning of each segment, which may directly follow an advertisement or another program segment.

Figure 4A:
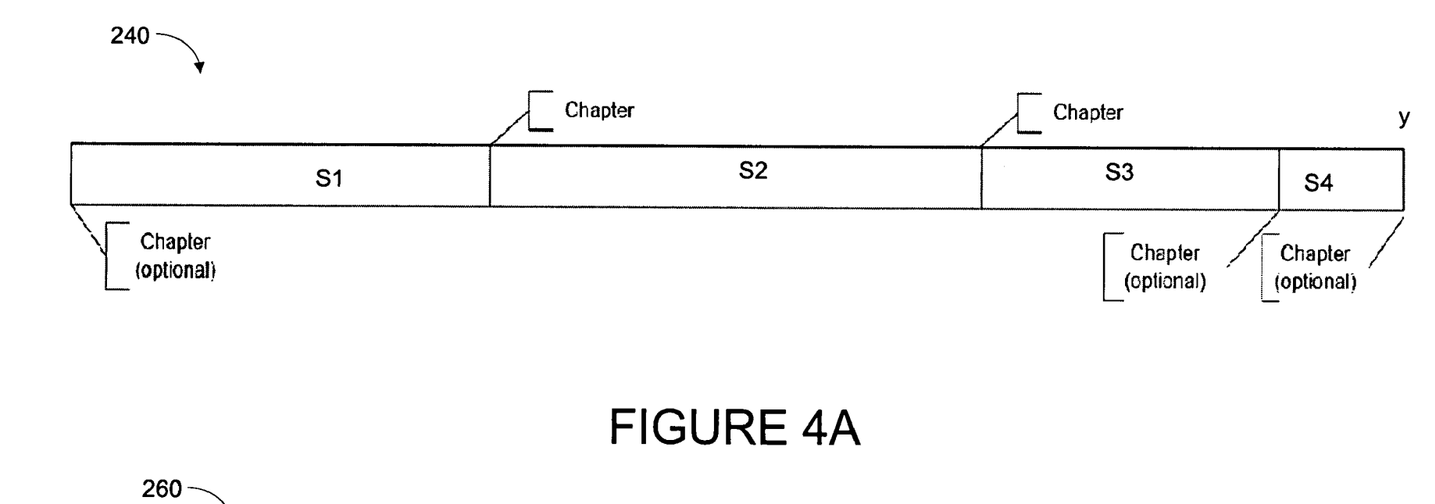
FIG. 4A illustrates a program of a third program content type associated with a second group according to an example embodiment.

FIG. 4A illustrates a program 240 of a third program content type associated with a second group according to an example embodiment. The third program content type may be considered as program content type C. The program 240 in this example is from the second group, different from the first group, e.g. a news program. The time length may be length y, such as 60 minutes.

The specific division of program content material may be as shown in FIG. 4A. In this particular example, there are four (4) segments, S1, S2, S3, and S4, where S2 is longer than S1, which is longer than S3, which is longer than S4. The program segments may be news, weather, local, sports, entertainment, etc. or the program segments may each be news features, for example.

In between each segment is a chapter point that enables a user to quickly move to the beginning of each segment, which may directly follow an advertisement or another program segment.

Figure 4B:
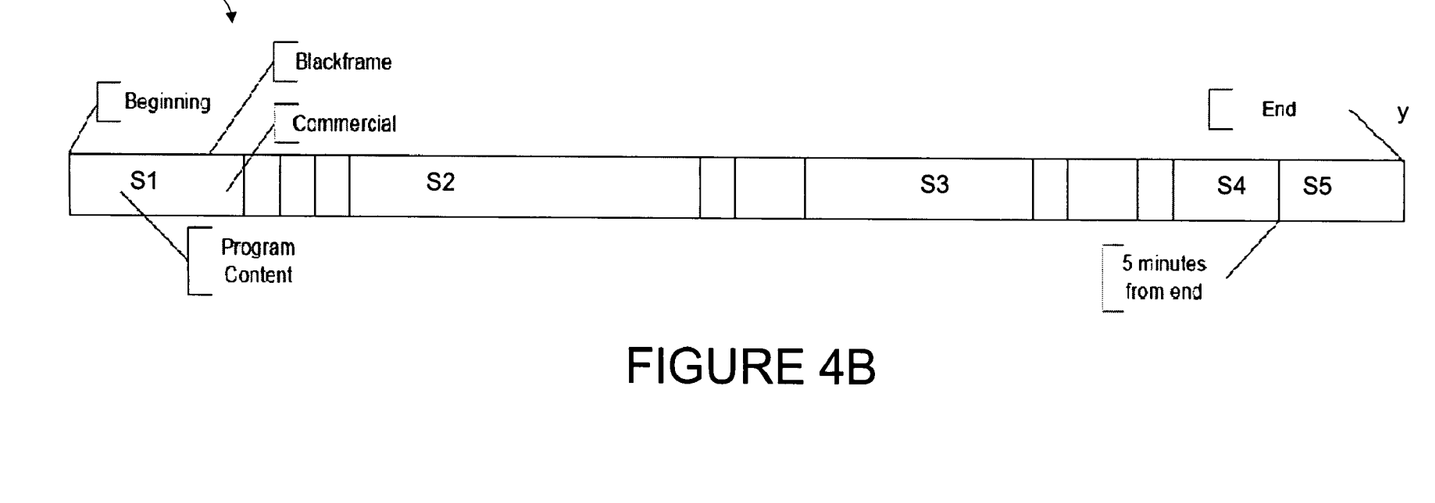
FIG. 4B illustrates a program of a fourth program content type associated with the second group according to an example embodiment.

FIG. 4B illustrates a program 260 of a fourth program content type associated with the second group according to an example embodiment. The fourth program content type may be considered as program content type D. The program 260 in this example is from the same group as the program 240 of FIG. 4A and is of the same time length.

However, the specific division of program content material may be as shown in FIG. 4B. In this particular example, there are five (5) segments, S1, S2, S3, S4, and S5, where S2 is longer than S3, which is longer than S1, S4 and S5. In between each segment is a chapter point that enables a user to quickly move to the beginning of each segment, which may directly follow an advertisement or another program segment.

The database 186 may be periodically updated with the plurality of program format codes and the corresponding plurality of program format types. The updating may take place via a network 326 (FIG. 5), for instance.

Multiple programs may be broadcast through the data 184 at any given time, each with their own program content data and index data.

Means for receiving a data stream from a content provider may include the device 116 or 124, the modem 114, 122, or the modem receiver 121, for instance. Means for accessing a look up table may include the STB CP 174 or instructions 324, for instance, or may accordingly appropriately configure the processor 170 (or a processor 302 of FIG. 5) to perform the various functions. Means for determining chapter points of the particular program may include using the STB CP 174 or instructions 324 with the received index data, for instance, or using the blackframe method, or may appropriately configure the processor 170 (or a processor 302 of FIG. 5) to perform the various functions. Means for determining the program format type corresponding to the one of the plurality of program format codes may include using the STB CP 174 or instructions 324 or may appropriately configure the processor 170 (or a processor 302 of FIG. 5) to perform the various functions. In alternative embodiments, the above means may each be implemented in hardware, firmware, or a combination of software, hardware and firmware.

Computer Architecture

Figure 5:
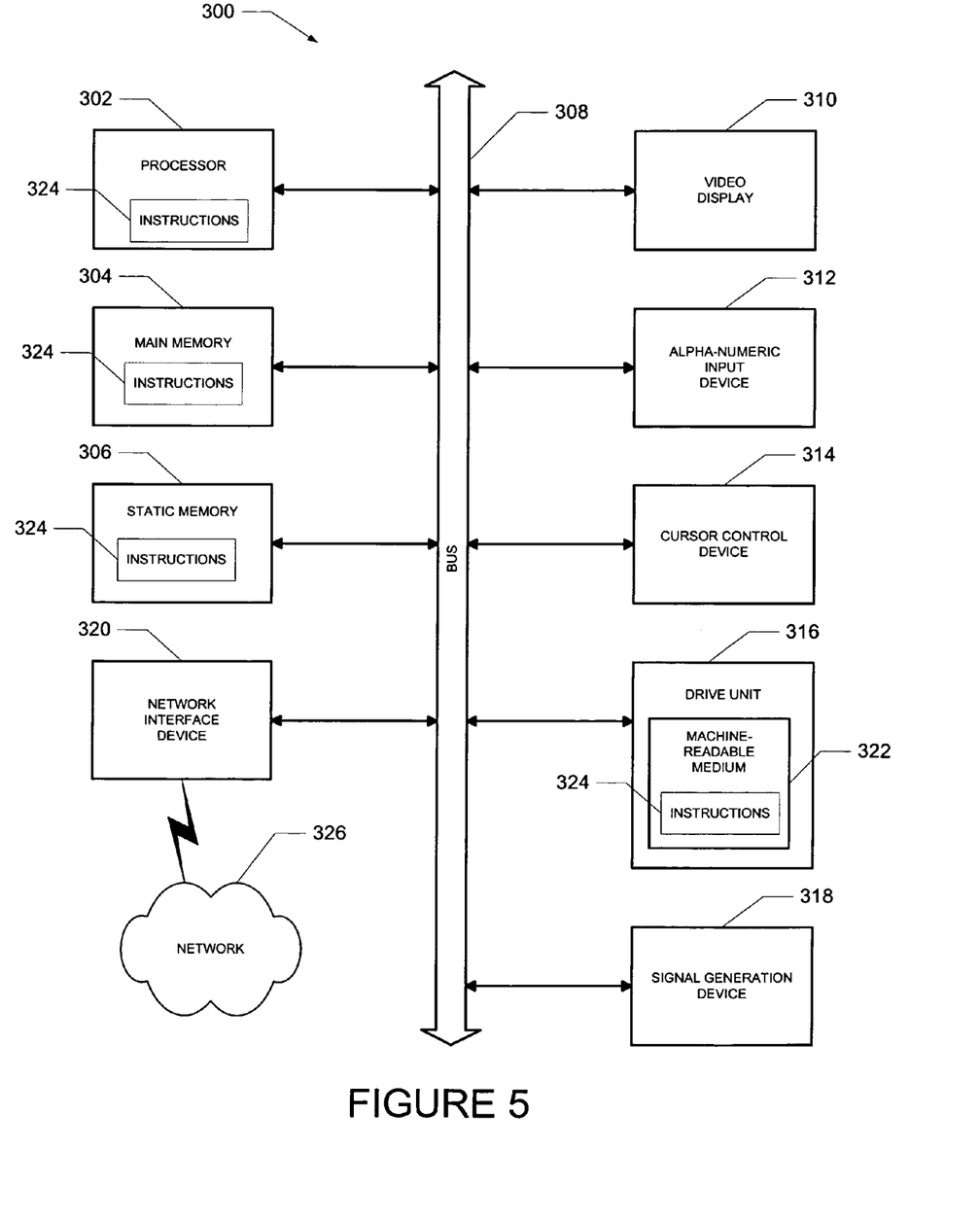
FIG. 5 shows a diagrammatic representation of machine in the example form of a computer system within which a set of instructions, for causing the machine to perform any one or more of the methodologies discussed herein, may be executed.

FIG. 5 shows a diagrammatic representation of a machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a digital video recorder (DVR), a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The main memory 304 and/or the static memory 306 may be used to store the recorded programs and/or the look up tables.

The computer system 300 may further include a video display unit 310 (e.g., a television, a liquid crystal display (LCD) or a cathode ray tube (CRT)) on which to display broadcast or other programs, for example. The computer system 300 also includes an alphanumeric input device 312 (e.g., a keyboard or a remote control), a user interface (UI) navigation device 314 (e.g., a remote control, or a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein (e.g., the software to access the look-up table in the database 186 to find the program format type corresponding with the transmitted program format code). The software 324 may also reside, completely or at least partially, within the main memory 304 and/or within the processor 302 during execution thereof by the computer system 300, the main memory 304 and the processor 302 also constituting machine-readable media.

The software 324 and/or the data 184 from the content servers 180 may further be transmitted or received over a network 326 (e.g., a television cable provider) via the network interface device 320 utilizing any one of a number of well-known transfer protocols (e.g., broadcast transmissions, HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories and optical and magnetic media.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system to process video program content material of a program in which the video program content material is provided by an Internet Protocol Television (IPTV) content provider, the system comprising:
   a programmable hardware device comprising a set-top box associated with a digital video recorder;
   a data stream associated with a particular television program and provided to the programmable hardware device, the data stream including program content data associated with the particular television program and including index data corresponding to the program content data of the particular television program, wherein the index data includes one of a plurality of program format codes; and
   a database accessible by the device and including a look up table of the plurality of program format codes with a corresponding plurality of program format types, each program format type associated with a specific division of program content material, wherein the one of the plurality of program format codes is associated with a corresponding program format type of the plurality of program format types of the index data, wherein the database periodically updates to newer versions of the plurality of program format codes and the corresponding plurality of program format types via the IPTV content provider,
   wherein the specific division of program content material includes chapter points segmenting the video program content material of the particular television program, and
   wherein the chapter points are determined by using a computer program of the set top box and are inserted at a beginning of the particular television program and at an end of the particular television program, wherein the chapter points are inserted at a beginning of a commercial advertisement group and at an end of the commercial advertisement group.

2. The system of claim 1 wherein the chapter points are inserted at a beginning of a segment of the particular television program and at an end of the segment.

3. The system of claim 2 wherein there are more than two segments for the particular television program.

4. The system of claim 1 wherein the particular television program is selected from a television programming group of a drama, a movie, a situation comedy, a news program, a feature presentation, a special event, a sports program, and a variety show, wherein there is a program format type of the plurality of program format types associated with each member of the television programming group and with each time length of the particular television program.

5. A method to process video program content material in which the video program content material is provided by an Internet Protocol Television (IPTV) content provider, the method comprising:
   receiving a data stream from the IPTV content provider, the data stream including program content data associated with a particular television program and including index data corresponding to the program content data of the particular television program, wherein the index data includes one of a plurality of program format codes;
   accessing a database to determine a program format type of the particular television program, the database including the plurality of program format codes and including a corresponding plurality of program format types, wherein each program format type is associated with a specific division of program content material;

determining, utilizing a set top box computer program, chapter points of the particular television program in response to the associated specific division of program content material of a program format type corresponding to the one of the plurality of program format codes; and inserting the chapter points at a beginning of the particular television program, at an end of the particular television program, at a beginning of a commercial advertisement group, and at an end of the commercial advertisement group, wherein the database is periodically updated with the plurality of program format codes and the corresponding plurality of program format types via the IPTV content provider.

6. The method of claim 5 further comprising determining the program format type corresponding to the one of the plurality of program format codes.

7. The method of claim 5 further comprising using a black-frame method to determine the chapter points.

8. The method of claim 5 wherein the chapter points are inserted at a beginning of a segment of the particular television program and at an end of the segment.

9. The method of claim 8 wherein there are more than two segments for the particular television program.

10. The method of claim 5 wherein the particular television program is selected from a television programming group of a drama, a movie, a situation comedy, a news program, a feature presentation, a special event, a sports program, and a variety show, wherein there is a program format type of the plurality of program format types associated with each member of the television programming group and with each time length of the particular television program.

* * * * *